(No Model.)
F. M. DAVIS.
CAR WHEEL.
No. 340,986. Patented May 4, 1886.
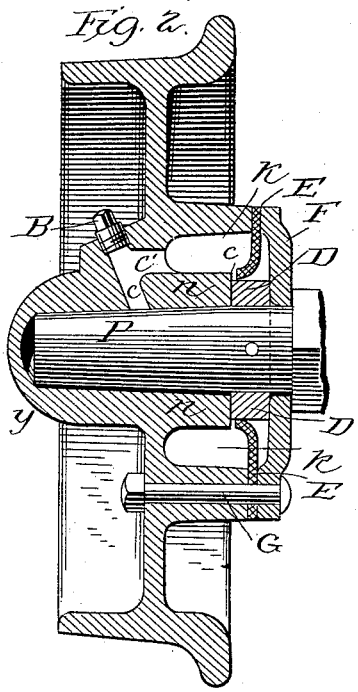
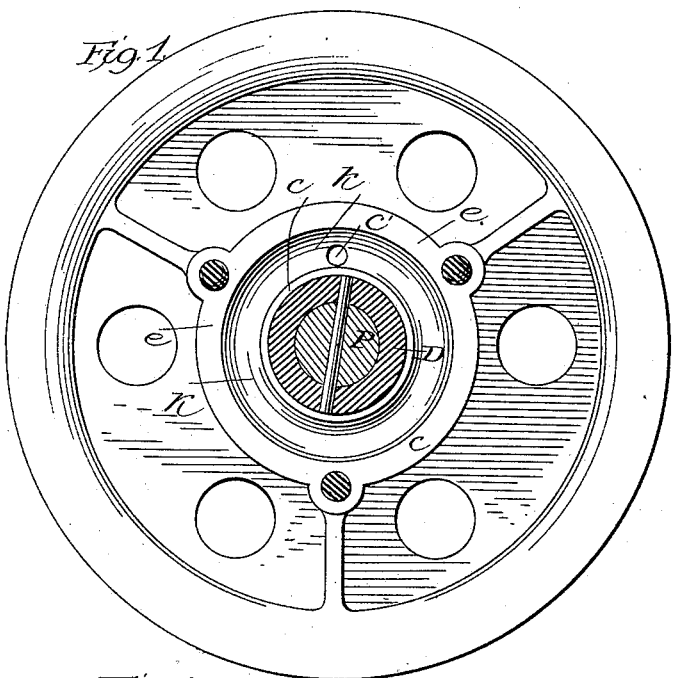
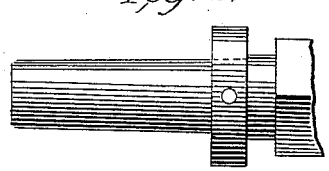
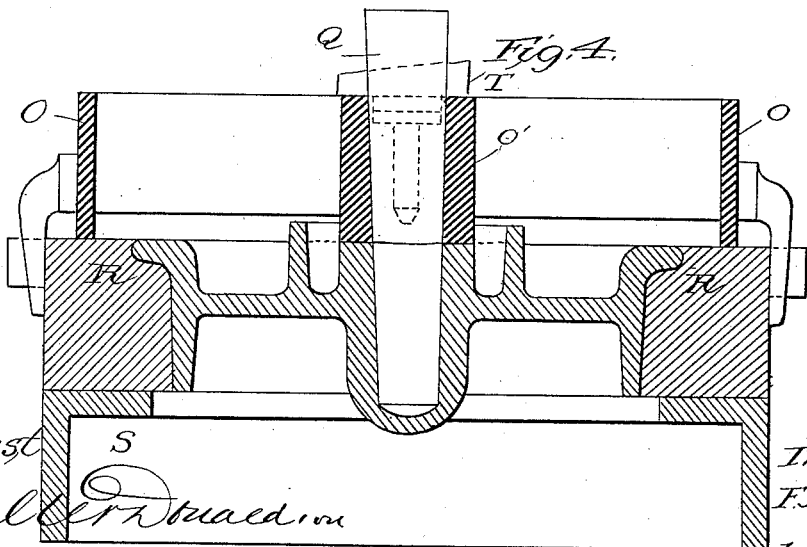
Inventor
F. M. Davis
by
Joyce & Spear
Attys

UNITED STATES PATENT OFFICE.

FRANCIS M. DAVIS, OF DENVER, COLORADO.

CAR-WHEEL.

SPECIFICATION forming part of Letters Patent No. 340,986, dated May 4, 1886.

Application filed November 9, 1885. Serial No. 182,270. (No model.)

*To all whom it may concern:*

Be it known that I, FRANCIS M. DAVIS, of Denver, in the county of Arapahoe and State of Colorado, have invented a new and useful Improvement in Car-Wheels; and I do hereby declare that the following is a full, clear, and exact description of the same.

My invention relates to car-wheels of that class which are adapted to turn upon the axle. The object of the invention is to provide chilled surface wherever such surfaces are exposed to wear, and, in connection with such chilled surfaces, to provide an oil-chamber within or about the wheel-hub, whereby the parts may be constantly kept lubricated, and further, to exclude grit from the wearing-surfaces of the axle and wheel.

In carrying out my invention all these objects have been kept in view, and the oil-chamber so constructed in relation to the hub of the wheel that the metal about the central parts of the wheel is made of approximately uniform thickness in the parts which are to be subjected to the chill, whereby the surfaces may be chilled without undue strain upon the metal. The same construction secures this object and at the same time provides the main part of the oil-chamber.

The accompanying drawings show my invention. In these drawings, Figure 1 represents a plan view of the wheel. Fig. 2 represents a section taken centrally through the hub. Fig. 3 represents an axle, and Fig. 4 shows the molds and illustrates the method of casting and chilling the wheels.

The tread of the wheel and the surface within the hub against which the axle bears and the surface within the inner end of the hub (marked *c*) are the wearing-surfaces of the wheel, and these surfaces are subjected to the chill when the wheel is cast. In respect to the tread-flanges and the web the wheel is not different from those of ordinary construction. The hub at the outer end (shown at *y*) is cast closed. About the inner end of the hub I form an annular recess, K, extending from the inner face of the hub as far as the web of the wheel. This forms the oil-chamber, or the main part of it, and I leave between this and the central cavity which receives the axle a sufficient thickness of metal for the purpose of strength. The annular flange *e*, which forms the outer wall of the oil-chamber K, I preferably extend inwardly farther than the hub *n*. Upon the axle P is fixed a collar, D, which, when the axle is in place, bears snugly against the inner end of the hub *n*. Upon the axle is a plate, F, which is bolted to the flange *e* with bolts G, and bears against the collar D. Between this plate and the edge of the flange *e*, I clamp a leather washer, E, or other suitable material. The opening in the center of this washer is considerably less than the exterior diameter of the collar D, so that when the hub is slipped in place it bends in the inner end of the washer, as shown in Fig. 2. This leather washer forms the wall on one side of the oil-cup K, but allows the oil to lubricate the joint at the inner surface, *z*, of the hub *n*. The flange *e* is suitably enlarged, as shown in Figs. 1 and 2, for the holes of the bolts G.

In order to provide a passage for filling the oil-chamber to allow the oil to flow from the chamber to the axle, I form hole C', which is plugged up by screw-plugs B.

Special construction of the chill and mold required for this form of wheel is shown in Fig. 4 in vertical central section. The cope (shown at O) has a central tubular hub, O', in which is fitted a pin, Q, and held in exact position, and the lower face of the central hub of part O' chills the face of the hub of the wheel which bears upon the collar of the axle. The chill for the rim of the wheel is shown at R, its upper surface being flush with the face of the wheel-flange, and adapted to receive and support the cope. It rests upon the drag S of the mold. This form of construction always secures an accurate hole in the center of the wheel, and the pin Q serves as a chill for the inner or bearing surface of the hub. As the iron in chilling would clamp the pin Q if it were left in position, it is turned with a very slight taper and slotted to receive the key T. The hole in the hub O' of the cope is also turned with a corresponding taper. The pin is allowed to go through only so far that after the iron is poured the key can be driven in, and the pin slightly withdrawn and loosened enough to prevent any binding when the iron is cooling.

I claim as my invention—

A cast-metal wheel having the hub closed at the outer end, and formed with an oil-cavity, K, about the hub, in combination with the axle and the collar D, fixed thereto, and with the plate F and leather collar, the hub being formed with holes for the oil, all substantially as described.

In testimony whereof I have signed my name to this specification in the presence of two subscribing witnesses.

FRANCIS M. DAVIS.

Witnesses:
H. P. PARMELEE,
WM. SCOTT LEE.